(12) United States Patent
Lien

(10) Patent No.: US 10,417,122 B2
(45) Date of Patent: Sep. 17, 2019

(54) DATA RANDOMIZATION USING MEMORY BLOCK ACCESS COUNTS

(71) Applicant: Seagate Technology LLC, Cupertino, CA (US)

(72) Inventor: Nicholas Odin Lien, Farmington, MN (US)

(73) Assignee: Seagate Technology LLC, Cupertino, CA (US)

( * ) Notice: Subject to any disclaimer, the term of this patent is extended or adjusted under 35 U.S.C. 154(b) by 455 days.

(21) Appl. No.: 14/871,148

(22) Filed: Sep. 30, 2015

(65) Prior Publication Data
US 2017/0090764 A1    Mar. 30, 2017

(51) Int. Cl.
| | | |
|---|---|---|
| G06F 12/02 | (2006.01) | |
| G11C 16/34 | (2006.01) | |
| G11C 7/10 | (2006.01) | |
| G11C 16/10 | (2006.01) | |
| G11C 16/22 | (2006.01) | |
| G06F 21/31 | (2013.01) | |
| G06F 21/60 | (2013.01) | |
| G06F 21/79 | (2013.01) | |

(52) U.S. Cl.
CPC ........ G06F 12/0246 (2013.01); G06F 21/316 (2013.01); G06F 21/602 (2013.01); G06F 21/79 (2013.01); G11C 7/1006 (2013.01); G11C 16/10 (2013.01); G11C 16/22 (2013.01); G11C 16/349 (2013.01); *G06F 2221/2133* (2013.01)

(58) Field of Classification Search
CPC ...... G06F 3/064; G06F 12/0246; G06F 21/60; G06F 3/0604; G06F 3/0679; G06F 21/79; G06F 21/602; G06F 21/316; G06F 2221/2133; G11C 16/22; G11C 16/10; G11C 7/1006; G11C 16/349
See application file for complete search history.

(56) References Cited

U.S. PATENT DOCUMENTS

| | | | |
|---|---|---|---|
| 7,961,520 B2 | 6/2011 | Strope | |
| 8,127,200 B2 | 2/2012 | Sharon et al. | |
| 8,176,284 B2 | 5/2012 | Frost et al. | |
| 8,397,101 B2 | 3/2013 | Goss et al. | |
| 8,719,491 B2 | 5/2014 | Chen et al. | |
| 8,745,357 B2 | 6/2014 | Tucek et al. | |
| 8,799,593 B2 | 8/2014 | Chung et al. | |
| 2006/0181934 A1* | 8/2006 | Shappir | G06F 12/1408 365/185.33 |
| 2006/0274114 A1* | 12/2006 | Silverbrook | B41J 2/14427 347/43 |
| 2009/0150595 A1* | 6/2009 | Lavan | G11C 16/0475 711/103 |
| 2009/0323942 A1* | 12/2009 | Sharon | G11C 7/1006 380/44 |

(Continued)

*Primary Examiner* — Arpan P. Savla
(74) *Attorney, Agent, or Firm* — Hall Estill Attorneys at Law

(57) ABSTRACT

Method and apparatus for data storage. In some embodiments, a solid-state memory includes an array of non-volatile memory cells arranged into erasable blocks. A register stores a multi-bit sequence value. A controller randomizes input data to be written to a selected erasable block by combining the input data with the multi-bit sequence value shifted by a number of bit locations responsive to an accumulated access count for the selected erasable block.

20 Claims, 5 Drawing Sheets

(56) References Cited

U.S. PATENT DOCUMENTS

| | | | |
|---|---|---|---|
| 2011/0085657 A1* | 4/2011 | Matthews, Jr. | G06F 12/1408 |
| | | | 380/28 |
| 2011/0246710 A1 | 10/2011 | Strope | |
| 2012/0005416 A1* | 1/2012 | Lee | G06F 12/0246 |
| | | | 711/103 |
| 2013/0101111 A1* | 4/2013 | Sharon | G11B 20/0021 |
| | | | 380/28 |
| 2016/0139827 A1* | 5/2016 | Lee | G06F 3/0679 |
| | | | 711/103 |

* cited by examiner

US 10,417,122 B2

DATA RANDOMIZATION USING MEMORY BLOCK ACCESS COUNTS

SUMMARY

Various embodiments of the present disclosure are generally directed to a method and apparatus for storing data in a solid-state memory, such as but not limited to a NAND flash memory device.

In some embodiments, a solid-state memory includes an array of non-volatile memory cells arranged into erasable blocks. A register stores a multi-bit sequence value. A controller randomizes input data to be written to a selected erasable block by combining the input data with the multi-bit sequence value shifted by a number of bit locations responsive to an accumulated access count for the selected erasable block.

In other embodiments, a solid-state drive (SSD) includes an SSD memory module with a solid-state memory having an array of non-volatile memory cells arranged into erasable blocks. An SSD controller coupled to the SSD memory module via an internal interface directs data transfers between the SSD memory module and an external host device. A data scrambler circuit randomizes input data to be written to a selected erasable block by shifting a multi-bit sequence value stored in a register a selected number of bit locations in a selected location responsive to an accumulated program/erase (PE) count associated with the selected erasable block to generate a shifted multi-bit sequence value, and combines the shifted multi-bit sequence value with the input data using a selected combinatorial function.

In further embodiments, a method includes steps of accumulating access counts for each of a number of erasable blocks of non-volatile memory cells in a solid-state memory indicative of a total number of access operations upon each of the respective erasable blocks; receiving input write data to be written to a selected erasable block; scrambling the input write data to form scrambled write data; and writing the scrambled write data to the selected erasable block, the scrambled write data formed by shifting a base multi-bit sequence value in a register by a number of bit locations selected in relation to the access count for the selected erasable block to provide a shifted multi-bit sequence value, and by combining the shifted multi-bit sequence value with the input write data using a selected combinatorial function.

These and other features and advantages which characterize the various embodiments of the present disclosure can be understood in view of the following detailed discussion and the accompanying drawings.

DETAILED DESCRIPTION

Figure 1:
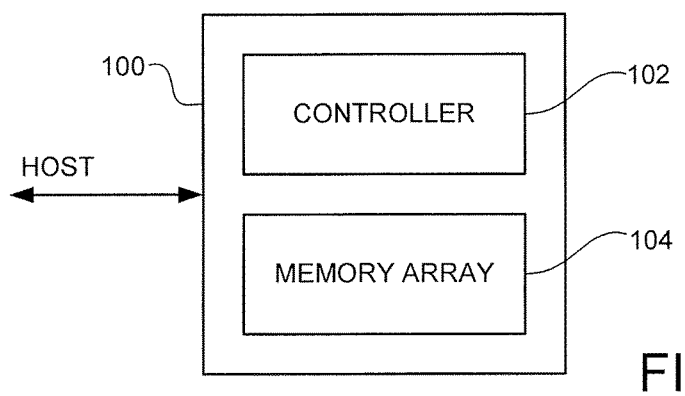
FIG. 1 provides a functional block representation of a data storage device constructed and operated in accordance with various embodiments of the present disclosure.

The present disclosure generally relates to systems and methods for storing data in a non-volatile memory.

The majority of solid-stage data storage devices on the market today utilize NAND flash memory. This type of memory generally operates to store data in the form of accumulated electrical charge on a floating gate cell that represents one or more bits. The programmed state can be sensed through the application of one or more sense voltages to the cell. The cells may be arranged in a single layer planar (e.g., two dimensional, 2D) array or a multi-layer (e.g., three dimensional, 3D) lattice structure. The cells are divided into erasure blocks and the blocks in turn are subdivided into pages.

As used herein, the term block, or erasure block, refers to the smallest number of cells that can be erased concurrently. An erasure process removes previously accumulated charge from the floating gates to restore the cells to an unprogrammed state ready for the storage of new data. The term page refers to the smallest number of cells in a block that can be programmed and read at a time, and usually lies along a single axis of the array or lattice structure (e.g., a row). Single level cells (SLCs) store a single bit using two available programming stages (e.g., 0 or 1). Multi-level cells (MLCs) are cells having four (4) possible program states and are configured to store two (2) bits of data (e.g., 00, 10, 11, 01). Using MLCs, two pages of data may be stored in a single row of cells, all of which are connected by a common word line (WL). Three-level cells (TLCs) have eight (8) possible program states and is configured to store three (3) bits of data (e.g., from 000 to 111). Using TLCs, three pages of data may be stored to a single row of cells interconnected by a common WL. Generally, $2^N$ programming states can accommodate N programming stages, and so any number of program stages and corresponding bits can be stored as required.

It is generally desirable to randomize write data to a solid-stage memory array such as a NAND flash memory array. Randomization generally entails providing the cells with substantially equal numbers of distributions of the different available program states. One limitation that has been observed with some randomization techniques is the repeated reprogramming of the same program states. If data are aligned the same way on a block for every programming cycle, then generally, whenever fixed pattern data are written to the memory, many of the cells may be programmed to the same state for every program cycle. This can lead to accelerated wear of the memory.

Accordingly, various embodiments of the present disclosure are generally directed to an apparatus and method for providing time varying data sequencing. As explained below, some embodiments include a solid-state memory comprising an array of non-volatile memory cells arranged into erasable blocks, such as but not necessarily limited to NAND flash memory.

A hardware register is provided which stores a multi-bit sequence value of M bits in length. The M-bit sequence value is used to scramble input write data of N bits in length presented to the memory for storage during a write operation, where N and M are plural numbers. N may be greater than M but this is not necessarily required. The M-bit sequence is shifted for each successive write operation.

A controller accumulates an access count for each of the erasable blocks and randomizes the input write data to be written to a first page in a selected erasure block by combining the input data with the multi-bit sequence value shifted by a number of bit locations responsive to the accumulated access count. The access count can take a variety of forms such as program/erase (PE) counts, write counts, etc. The M-bit sequence value is further shifted for each additional page of data written to the selected erasure block during the write operation.

In some embodiments, a scrambler circuit generates or otherwise provides the M-bit sequence as a random bit sequence where M is a relatively short value, such as on the order of about 512 bits (e.g., M=512). Other values for M can be used. As used herein, the term "random" will encompass "pseudo-random" values as well as true random numbers and numbers that are mathematically indistinguishable from true random numbers.

The scrambler circuit stores the M-bit sequence in a hardware register. The input write data are combined with the M-bit sequence using a selected combinatorial function, such as exclusive-or (XOR) to scramble (randomize) the input data among the available programming stages. Prior to scrambling, the M-bit sequence is shifted using a circular shift operation based on a program/erase (PE) count associated with the access rate of the block to which the data are being written. Moreover, the M-bit sequence is further shifted by some amount, including but not limited to one bit location, for each successive row address of the input write data during the write operation. In this way, the sequence is shifted by (at least) one bit per wordline when writing to a given block. This provides an M-bit sequence that is shifted by both word line and bit line (and in the case of 3D lattice structures, channel-select lines), yielding improved cell distributions along all pertinent axes.

The amount of shift to be applied may be specified by the controller each time data are read, programmed and/or erased. The controller may maintain access counts that can be used to create a suitable shift modifier value. The data are accordingly scrambled deterministically in nominally a different way each time that new data are written to the array.

To recover previously written data, the corresponding shift in the M-bit sequence is determined and applied to the scrambled data to return the originally presented data. From a practical standpoint, the system may maintain a relatively low number of possible shift modifiers based on access counts (e.g., on the order of 4-8 modifiers, although other values can be used), so that in a worst case scenario, a retry step may be applied for each of the possible modifiers during extended recovery attempts. In this way, a highly randomized input is maintained that shifts on every write, but the data can be readily recovered using a relatively small possible number of shift permutations. In particular, fixed pattern writes are provided with a different write pattern each time the data are supplied to the memory.

While exemplary embodiments presented below are directed to NAND flash memories, such is merely exemplary and is not necessarily limiting. The various embodiments disclosed herein can be extended to any number of different types of memories and shift methodologies. Substantially any grid or latticed based memory organization can be used, including two dimensional (2D) or three dimensional (3D) structures. Other constructions include but are not limited to charge trap NAND, RRAM (resistive random access memory), STRAM (spin-torque transfer random access memory), etc.

These and other features and advantages of various embodiments can be understood beginning with a review of FIG. 1 which provides a functional block diagram for an exemplary data storage device 100. The device 100 is characterized as a solid-state drive (SSD) that employs non-volatile semiconductor memory such as NAND flash memory, although the present disclosure is not so limited.

The device 100 includes a controller 102 which provides top-level control and communication functions as the device interacts with a host device (not shown) to store and retrieve host user data. A memory array 104 provides non-volatile storage of the data in the form of an array of flash memory cells. It will be appreciated that a number of additional circuits may be incorporated into the device as desired, such as an input/output (I/O) communications circuit, one or more data buffers, a hierarchical cache structure, read/write drivers, local dynamic random access memory (DRAM), and on-the-fly ECC generating circuitry.

The controller 102 may be a programmable CPU processor that operates in conjunction with programming stored in a computer memory within the device. The controller may alternatively be a hardware controller. The controller may be a separate circuit or the controller functionality may be incorporated directly into the memory array 104.

As used herein, the term controller and the like will be broadly understood as an integrated circuit (IC) device or a group of interconnected IC devices that utilize a number of fundamental circuit elements such as but not limited to transistors, diodes, capacitors, resistors, inductors, waveguides, circuit paths, planes, printed circuit boards, memory elements, etc. to provide a functional circuit regardless whether the circuit is programmable or not. The controller may be arranged as a system on chip (SOC) IC device, a programmable processor, a state machine, a hardware circuit, a portion of a read channel in a memory module, etc.

Figure 2:
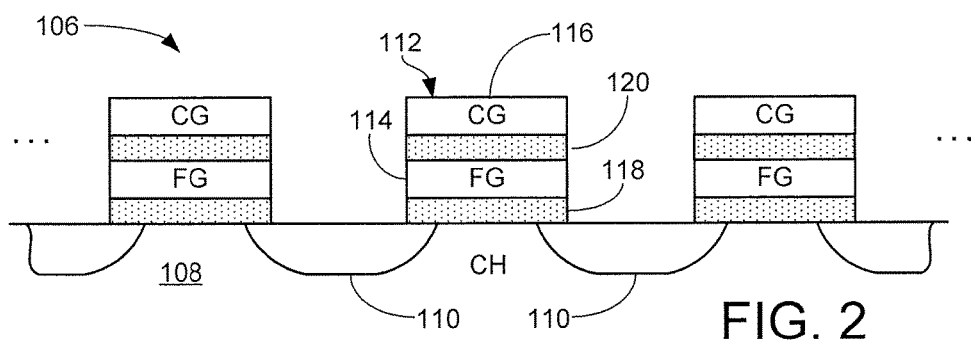
FIG. 2 illustrates a number of memory cells of the array of FIG. 1, which in some embodiments are characterized as non-volatile flash memory cells arranged in a NAND configuration.

FIG. 2 represents a number of flash memory cells 106 of the array 104 of FIG. 1 arranged in a NAND configuration. A substrate 108 includes spaced apart, localized doped regions 110. Adjacent pairs of the doped regions are spanned by gate structures 112 each comprising a floating gate (FG) 114, a control gate (CG) 116, and respective insulating oxide layers 118, 120. Application of a suitable gate voltage to a selected floating gate (FC) 114 establishes a conductive channel (CH) between the adjacent doped regions 110, thereby generating a drain-to-source conductivity path.

During a programming (data write) operation a write current is induced through the channel of a selected memory cell from one doped region 110 to the next. As the write current passes through the channel, charge will migrate from the channel, through the lower oxide layer 118 to the floating gate (FG) 114. The presence of accumulated charge on the floating gate 114 serves to alter the requisite threshold voltage $V_T$ applied to the control gate 116 to establish conductivity through the channel.

The flash memory cells 106 can store different programmed values in relation to different amounts of accumulated charge on the floating gate 114. In some embodiments, the cells 106 are arranged as multi-level cells (MLCs) so that each cell stores two (2) bits of data using four (4) different program stages, or charge levels. The program stages may be identified as 11, 10, 00 and 01 for ever increasing levels of stored charge. Different voltage threshold magnitudes can be sequentially applied to the control gate 116 to discriminate between these respective states during a read operation. Other formats may include single level cells (SLCs) which store only a single bit (e.g., logical 1 or 0), three level cells (TLCs) which store three bits (e.g., 000 to 111), etc.

Erasable memory cells such as the NAND flash memory cells require an erasure operation to remove the accumulated charge from the floating gate and return the floating gate to an uncharged state prior to the writing of new data to the cell. Such erasure operations are carried out on a set of the memory cells arranged as an erasure block. The physical migration of charge across the floating gate-channel boundary during write and erase operations can degrade the reliability of the memory cells over time. It can be desirable to program each cell to a different voltage level each time, since this can help average out this degradation effect overall for the cells in the array.

Figure 3:
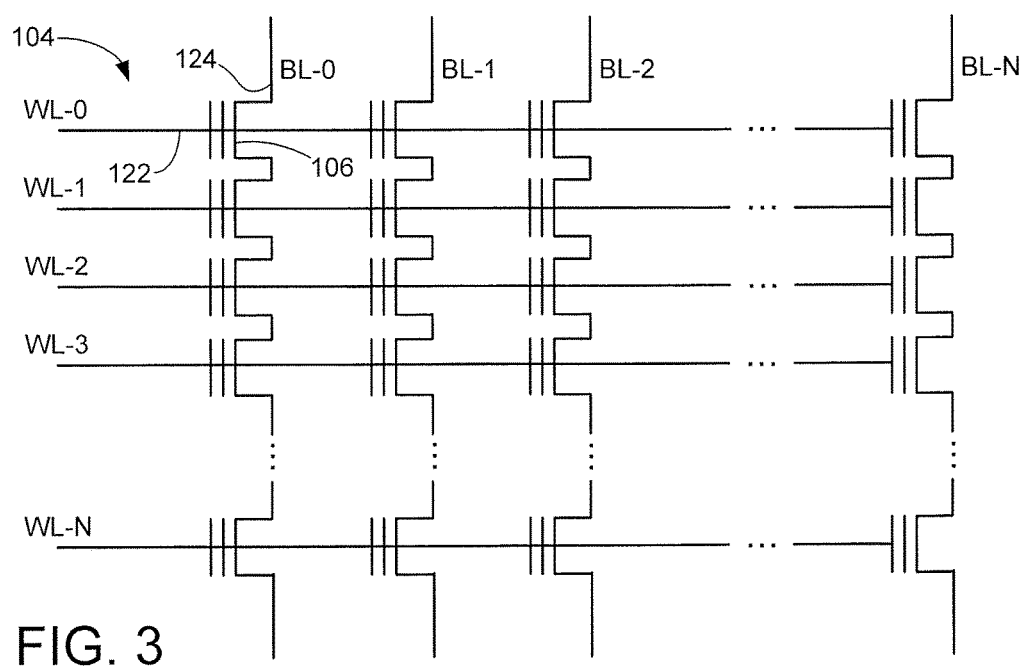
FIG. 3 is a schematic representation of a portion of the array of FIG. 1 using the NAND flash memory cells of FIG. 2.

FIG. 3 schematically depicts a number of the memory cells 106 of FIG. 2. The cells are arranged into rows and columns and are accessed by various control lines identified as word lines (WL) 122 and bit lines (BL) 124. Other control line configurations can be used. Respective voltage profiles are applied to the various control lines to read, write and erase data from the cells 106.

Figure 4:
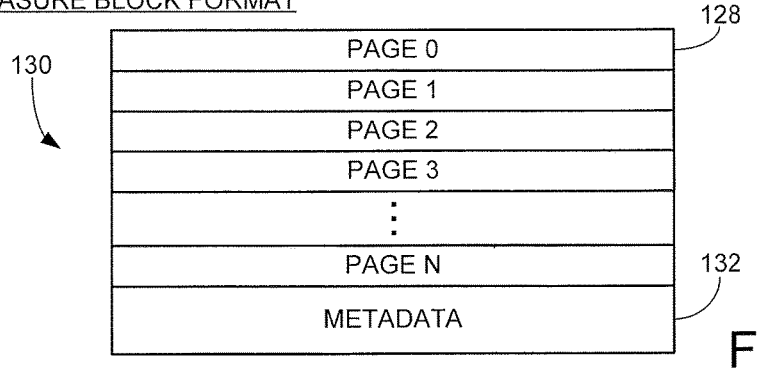
FIG. 4 sets forth an exemplary format for an erasure block of the array.

As shown in FIG. 4, all of the memory cells along each row (e.g., connected to a common word line 122 in FIG. 3) are associated with a separate page 128 of memory in an erasure block 130. An exemplary erasure block format has a total of 512 pages, with each page storing 8192 bytes of data. Other sizes of erasure blocks can be used. The erasure block 130 generally represents the smallest block of flash memory cells that can be erased at a time.

Metadata may be generated for use with each block 130. The metadata may be stored in a metadata block 132 appended to the end of the erasure block 130 as shown, or may be stored elsewhere in the device 100 such as in one or more erasure blocks dedicated to this purpose. The metadata provides certain types of overhead control information associated with the erasure blocks.

In some embodiments, the metadata include the logical addresses of the data stored in the associated erasure block. Other metadata include timestamp data, sequence information relating to when the block 130 was most recently allocated for use, and access counts associated with the various erasure blocks. The access counts can include program/erase (PE) counts indicative of the total number of times the cells in the block have been programmed and erased, read counts indicative of the total number of times read operations have been applied to the respective pages, etc.

Figure 5:
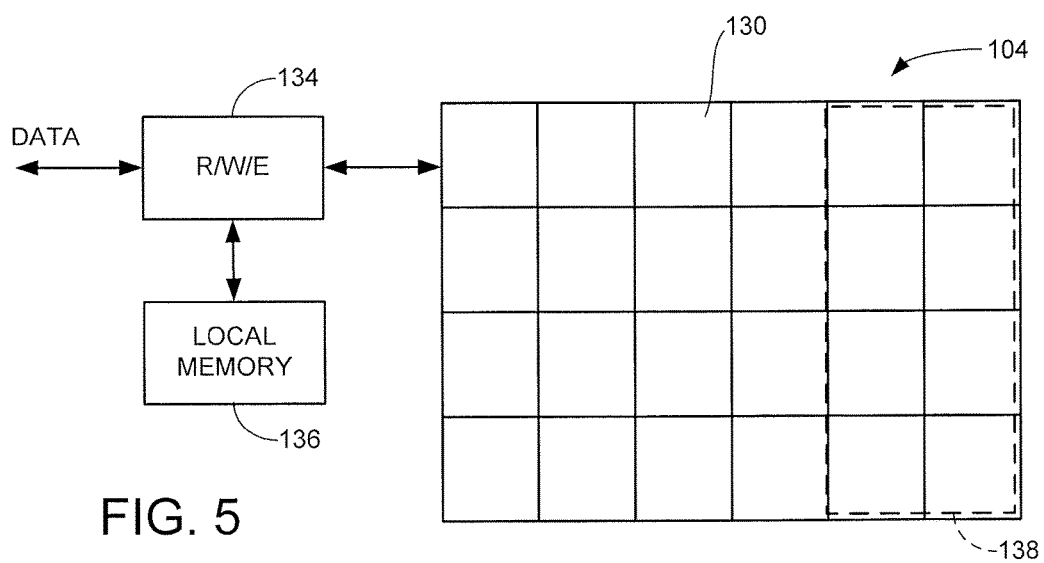
FIG. 5 is a functional representation of the array showing multiple erasure blocks as in FIG. 4.

FIG. 5 shows the memory array 104 of FIG. 1 to be made up of an array of erasure blocks 130 as set forth by FIG. 4. The blocks 130 may be physically adjacent to one another, or may be physically disposed on different layers, stripes, lanes or chips (dies). Each block 130 will have its own erasure block address. A read/write/erase (R/W/E) channel 134 directs read, write and erasure operations upon the various blocks 130 by applying appropriate voltages along the respective bit lines and word lines (see FIG. 3). A local memory 136 stores data, metadata and other control information during system operation. The local memory 136 may take a variety of forms including local volatile memory (e.g., DRAM), registers, data buffers, etc.

Because the exemplary flash memory cells generally need to be erased before new data can be written thereto, it is common for devices to write updated versions of sectors of user data from the host device having the same logical address (such as logical block address, LBA) identifier in different locations within the array. Each time the host provides a write command to write a selected LBA, the device 100 writes the data to a new page within the array 104.

The most recently stored version of a given LBA will be treated as the "current" data, and all previously stored versions constitute older "stale" data. The metadata utilizes forward pointers to enable the system to locate the current version of the data responsive to a read request for a particular LBA. Older, stale versions of the data will usually be ignored during a read operation for the sector unless the host specifically requests an older archived version of the sector using a special utility command.

The erasure blocks 130 may be grouped into larger groups of blocks that are referred to as garbage collection units (GCUs) 138 and which are allocated and erased as a unit. Garbage collection operations may be periodically carried out by the device 100 to reclaim blocks 130 that store stale data. Garbage collection operations take place in the background and may be scheduled at appropriate times, such as during idle periods with low host I/O activity. When most or all of the data in a selected GCU 138 are determined to be stale, the garbage collection process will erase the selected blocks in the GCU and place the erased GCU back into an allocation pool pending future allocation. Any current data in the block will be copied to a newly allocated block prior to the erasure operation.

Figure 6:
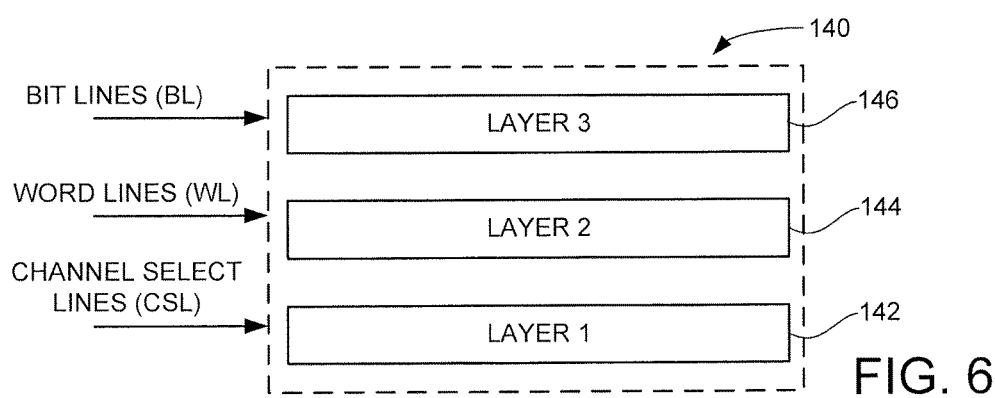
FIG. 6 depicts a multi-layer (three dimensional, 3D) NAND flash memory array in accordance with further embodiments.

FIG. 6 is a schematic representation of a multi-layer NAND structure 140 with multiple recording layers 142, 144 and 146 (referred to as Layers 1-3). Each layer generally corresponds to a two dimensional (2D) array of NAND flash memory cells such as depicted in FIG. 3, although such is not necessarily required. Each of the Layers 1-3 is interconnected with respective bit lines (BL) and word lines (WL), and the individual layers are selected using an additional set of channel-select lines (CSL).

Figure 7:
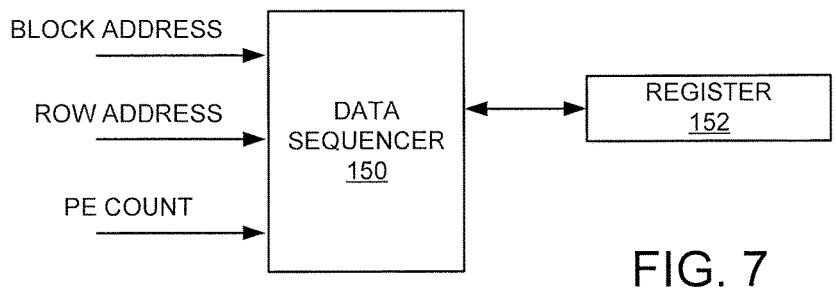
FIG. 7 illustrates a data sequencer constructed and operated in accordance with some embodiments.

FIG. 7 shows a data sequencer circuit 150 that scrambles (randomizes) input write data to be written to a memory array such as the arrays 104, 140 of FIGS. 1-6. The data sequencer circuit 150 takes the form of a controller or a portion thereof. In some cases, programming steps may be stored in a suitable memory location and executed by a firmware/software processor to carry out the functionality described below. In some cases, the data sequencer 150 or portions thereof are incorporated into the R/W/E channel 134 of FIG. 6. In other cases, the data sequencer 150 or portions thereof are incorporated into the top level controller 102 (see FIG. 1).

The data sequencer generates an M-bit sequence and stores the sequence in a hardware register 152. The M-bit sequence takes the form of a random bit sequence. Any number of random number and pseudo-random number generation techniques can be used to generate the M-bit sequence. For example, the random bit sequence may be externally supplied to the storage device from a host or other source using, for example, a host based OS random number generation routine. Local firmware and/or hardware entropy sources can be used with entropy extraction circuits to generate the random sequence. Local ring oscillator circuits or cryptographic and/or hash algorithms can be used to generate the random numbers. In some embodiments, multiple sequences are concurrently generated and used for different locations or sets of data in the array.

The length of the sequence (e.g., the value of M) can be any suitable value. In some embodiments, a value of 512 bits is used (e.g., M=512). In some cases, M will be set equal to the number of pages in each erasure block 130. In other cases, the value may be decorrelated from this value. While M may be a power of two, this is merely illustrative and is not necessarily limiting. It is contemplated albeit not necessarily required that M will be less than the total number of bits that are normally supplied for writing. For example, assuming that data are written using pages of data of 8192 bytes in length, this corresponds to 65,536 bits. If N represents the number of input data bits per page (e.g., N=65, 536), and M represents the number of bits in the scrambling sequence, then N>M. This is not necessarily limiting, however, as other embodiments contemplate N=M and even N<M, as desired.

Generally, the data sequencer 150 operates to apply data scrambling (randomization) along multiple time and space dimensions to input write data provided for writing to the NAND memory array. To this end, the data sequencer 150 receives a number of inputs such as, but not limited to, a block address, a row address and a PE count associated with the input data and target location therefor. Other data inputs may be used.

Figure 8:
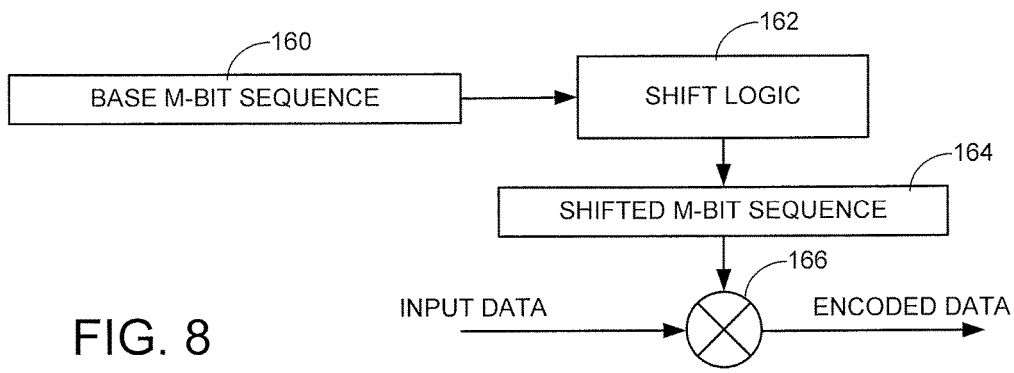
FIG. 8 is a logic flow which depicts operation of the sequencer of FIG. 7.

In response, the data sequencer 150 operates as generally indicated in FIG. 8 to shift the M-bit sequence and combine the shifted sequence with the input write data to provide encoded scrambled data. The base M-bit sequence is represented at 160, as stored in the register 152 of FIG. 7. Shift logic 162 imparts a circular shift operation upon the sequence to provide a shifted M-bit sequence, which is represented at 164. As will be recognized, a circular shift operation involves shifting, or advancing, each of the bits in the register in a common selected location (such as, e.g., to the "left" or to the "right" through the register). The one or more bits that are "pushed out" the end of the register are appended, in the same order, to the sequence at the opposite end of the register. In this way, the bits "circulate" through the register in the same order based on the shift direction.

The shifted M-bit sequence may be temporarily stored in another local memory location, such as a second register. Alternatively, the shifted sequence may be written back to the same register provided the system tracks the position of the sequence so that the base sequence can be retrieved at a later time.

The shifted M-bit sequence is thereafter combined with the input write data sequence using a selected combinatorial function block 166. In FIG. 8, the combinatorial function is identified as an exclusive-or (XOR) operation. This is merely exemplary and is not limiting as other forms of combinatorial functions can be used to transform the input data, such as an exclusive-nor (XNOR) operation, hash functions, cryptographic functions, etc. The output of the combinatorial function block 166 provides a stream of encoded data that are thereafter written to the selected location in the memory array 104, 140.

The scrambled data will nominally have a statistically consistent distribution of program states among the respective available programming states. For example, SLCs will have two (2) available program states (charge states) corresponding to logical values 1 and 0 in increasing levels of accumulated charge. Approximately 50% of the cells will be written to a program state that corresponds to logical 1 and approximately 50% of the cells will be written to a program state that corresponds to logical 0.

MLCs will have four (4) available program states corresponding to 11, 10, 00 and 01 in increasing levels of accumulated charge, and approximately 25% of the cells will be written to each of these logical states. TLCs will have eight (8) available programming stages corresponding to 111, 110, 101, 100, 000, 001, 011 and 010 in increasing levels of accumulated charge. Approximately 12.5% of the cells will be written to each of these logical states. Other arrangements are contemplated including arrangements that involve storing more than three (3) bits per cell.

The input data are processed upstream of the data scrambler 150 as required, including the application of encryption, run length limited (RLL) encoding, error correction code (ECC) processing, etc. Those skilled in the art will observe that this will result in some measure of "randomization" being applied to the input data prior to being subjected to the data scrambler 150. However, it will be appreciated that these techniques are necessarily repeatable. If a fixed (constant) data pattern is provided multiple times to such processing, the same output sequence will tend to be generated (otherwise, the originally presented data may not be recoverable).

Accordingly, the scrambling provided by the data sequencer 150 provides additional scrambling so that, even if the same fixed pattern is presented for writing, a different pattern will be written each time since the pattern will be altered in relation to an access parameter (access count) that is associated with a usage rate of the physical memory location to which the data are written. Nevertheless, it is contemplated in some embodiments that additional processing may be applied to the data prior to writing. For example and not by way of limitation, once the data sequencer 150 has applied data sequencing to the data, additional processing, such as but not limited to encryption, may be applied to the data prior to writing. In this way, no matter what data pattern is supplied to the array for writing, the data sequencer 150 provides a time and location dependent randomization of the data. This enhances both the wear leveling of the memory and the security of the data stored therein. Indeed, losing the wear count in the event of a cryptographic attack could serve to further reduce the likelihood of the decoding of the data by an attacking party.

The amount of shift (e.g., the number of bit locations moved by the shift logic) applied to the base M-bit sequence will depend on a variety of factors. In some embodiments, the total number of bit locations shifted will correspond to the PE count associated with the target block 130 to which the data are to be written. Other values can be used.

Since the number of PE counts for a given erasure block 130 (or larger GCU 138) can range from a relatively low number (e.g., a number near zero for a new device) to a relatively high number (e.g., around 5000 or more for a worn device), modulo techniques may be applied to limit the number of shift increments to a manageable level (e.g., a total of about 4-8 shift values, etc.). The actual number of increments can vary, so long as, generally, a different number of shift locations is applied for each successive write operation over some predetermined range of write operations.

Figure 9:
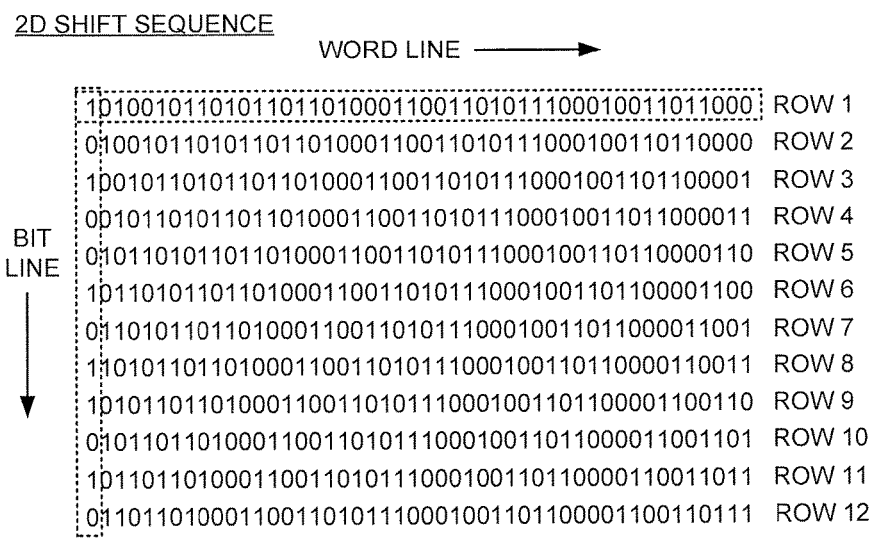
FIG. 9 shows a two dimensional (2D) shift sequence of the m-bit sequence of FIG. 7 in some embodiments.

FIG. 9 shows an array of two dimensional (2D) shift sequences for a given M-bit sequence. While the exemplary sequence is shown to only constitute a total of 48 bits, it will be appreciated that the sequence may be significantly longer (including but not limited to about 512 bits) so that only a portion of the overall sequence is represented in FIG. 9.

Regardless, it can be seen that each row in FIG. 9 (from Row 1 to Row 12) represents a shifting of the base sequence in each row to the left. In other words, the pattern along row 1 (in a word line or row direction) is the same as the first bit in each subsequent row in a bit line (column) direction. This is not limiting, as other shift directions and number of shifted bits can vary as required. Nevertheless, the exemplary embodiment shown in FIG. 9 shifts the bits to the left for each successive row. This means that, for a given write operation, the base M-bit sequence (represented by Row 1) is shifted each time, by one bit location, each time that data are written to a successive row of data.

Those skilled in the art will recognize that the data structure of FIG. 9 is based on the writing of SLC data, so that the data are arranged as an alphabet of binary elements (e.g, the characters in FIG. 9 are either 0 or 1, or from a population of two (2) available states). This has been presented for purposes of illustrating various embodiments and is not limiting. In other embodiments, the M-bit sequence may be arranged as a quaternary alphabet for MLC cells (e.g., the characters are 0, 1, 2 or 3, from a population of four (4) available states) or arranged as an octonary alphabet for TLC cells (e.g., the characters are 0, 1, 2, 3, 4, 5, 6 or 7, from a population of eight (8) available states). Other arrangements can be used. Regardless, the same general shifting algorithms will be applied based on the simplified example of FIG. 9.

It can be seen from a review of FIG. 9 that when a given input write data set are presented for writing to a selected erasure block, the first row of data (e.g., the first page of data) written to the selected erasure block during the write operation will utilize the base M-bit sequence shifted by an amount in relation to the accumulated access count associated with that selected erasure block. If the input write data set is large enough that it "wraps" onto multiple pages, which is contemplated as occurring on a relatively frequent basis, then each additional row (page) of data will be scrambled using the base M-bit sequence that is shifted by another bit location, as demonstrated in FIG. 9. For example and not by way of limitation, if a selected page 128 of data are to be written to a selected erasure block 130, the input data may be scrambled in accordance with the sequence shown at Row 1 in FIG. 9. The next page of data will be scrambled in accordance with the sequence shown at Row 2 of FIG. 9, and so on. In this way, both time based (e.g., PE counts) and location based (e.g, row increments) scrambling is provided to the base M-bit sequence.

It will be noted that the rows identified in FIG. 9 do not necessarily correlate to the rows in each of the erasure blocks 130. That is, "Row 1" in FIG. 9 represents the first row of data being written to a given erasure block during a given write operation. In other embodiments, the rows in FIG. 9 are correlated to row address so that, for example, a write to row 9 in a selected erasure block begins with the pattern corresponding to Row 9 in FIG. 9 (either prior to or after shifting based on PE count). These and other alternatives can be readily implemented by the skilled artisan in view of the present disclosure.

Figure 10:
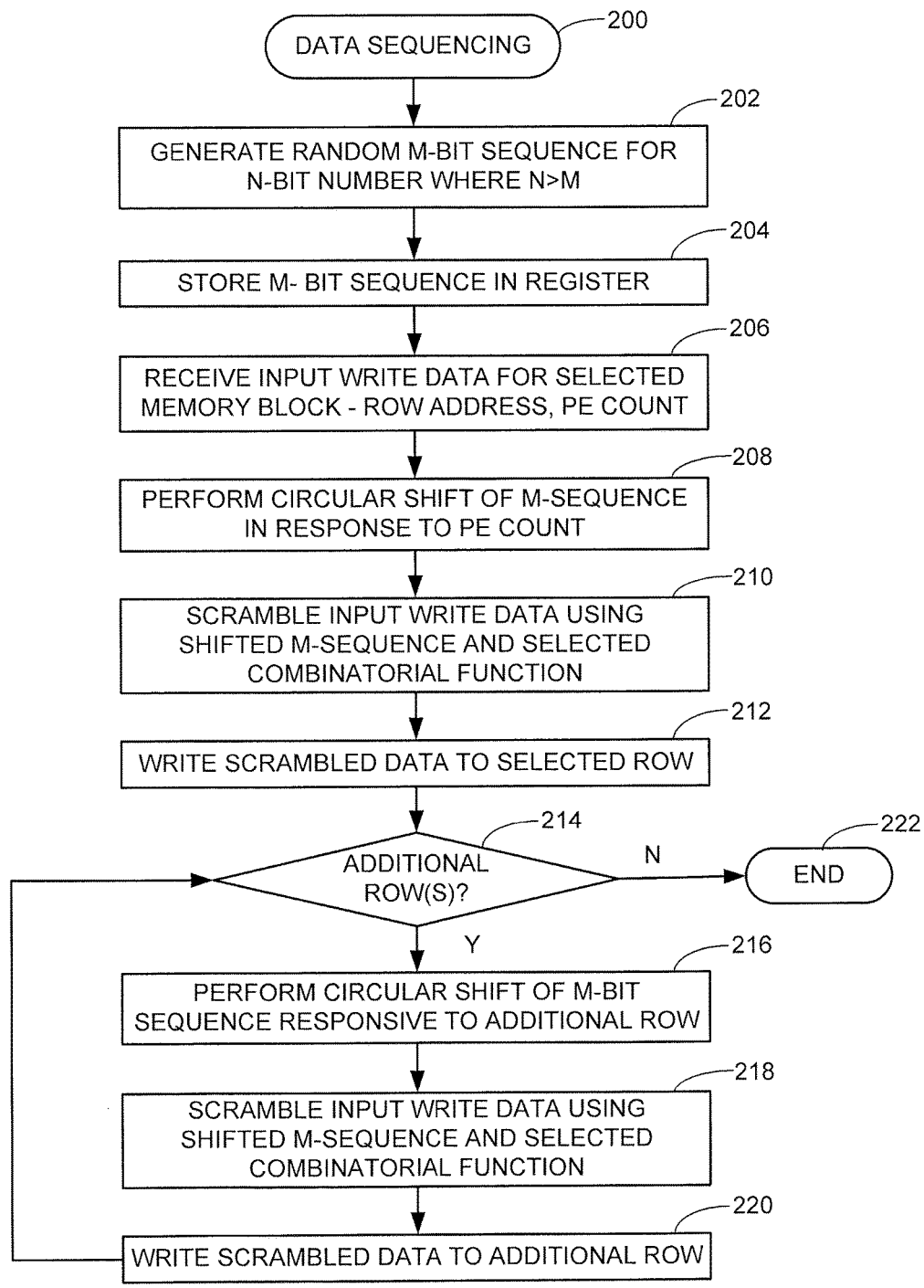
FIG. 10 is a flowchart for a DATA SEQUENCING routine generally illustrative of steps carried out in accordance with various embodiments of the present disclosure.

FIG. 10 provides a flow chart for a data sequencing routine 200 illustrative of steps carried out in accordance with the foregoing discussion. It will be contemplated that the routine 200 is performed using a data storage device 100 having a data scrambler 150 as set forth in FIG. 7 that scrambles (randomizes) data prior to writing to a memory array 104, 140. It is contemplated albeit not necessarily required that the routine 200 is carried out responsive to a host write command to write a selected set of write data to the memory array.

As shown by step 202, a random M-bit sequence is generated for an N-bit input write value, where M is less than N. It has been found that a relatively short M-bit value than N. is sufficient to provide the requisite program state distributions, so that it is not necessarily required that M=N or even M>N. These latter alternatives are contemplated and can be implemented as desired.

The M-bit sequence is stored in an appropriate register, as indicated by step 204. The register is configured to retain the base M-bit sequence for future reference. In some embodiments, the M-bit sequence may be further stored, for recovery purposes, in one or more non-volatile locations including a control data portion of the array 104.

While only a single M-bit sequence is referenced by the routine of FIG. 10, multiple sequences can be used for different locations of data as required, including different sequences for different wear states of the data. For example, in one embodiment, once a particular erasure block (or other location of memory) achieves a particular total number of access counts, a different M-bit sequence may be selected and implemented having values tailored to increase certain lower stress programming stages to further extend the useful life of the memory. These and other alternatives are readily within the ability of the skilled artisan to implement in view of the present disclosure.

At step 206, an input write data set is received for writing to the memory array. The data are intended to be written to a selected erasure block 130. A next available row address is identified in the erasure block for the input data. An access count (such as a PE count in the present example) is also provided during this step.

A circular shift of the base M-bit sequence is performed at least in relation to the received access (e.g., PE) count, step 208. The actual amount of bit locations during the shift can vary based on a number of factors. In one embodiment, an odd PE count results in a first number of shift locations, such as three (3) bit location and an odd PE count results in a different, second number of shift locations, such as four (4) bit locations.

In another embodiment, the total number of shift locations corresponds to the actual number of PE counts. Modulo math techniques can be applied by dividing the PE count by M and shifting the sequence in relation to the value of the remainder. Any number of other shift schemes can be implemented including a bucket method wherein values falling within certain ranges result in different amounts of shift. Generally it is contemplated that, each time a given set of data are presented for storage to a given location, a different amount of shift of the M-bit sequence is applied. The total number of shift positions can range from a relatively small number (e.g., 4-8) up to a number approaching (or equal to) M.

Once the M-bit sequence has been shifted, the input write data are scrambled at step 210 using the shifted M-bit sequence in relation to a selected combinatorial function. The example presented above in FIG. 8 uses a XOR function, but other functions, including multiple cascaded functions, can be used so long as the original, unscrambled data can be subsequently retrieved during a follow up read operation. The scrambled data are thereafter written to a selected row in the selected erasure block, step 212.

At this point in the routine, decision step 214 determines whether there are one or more additional rows (e.g., pages) of data in the input data to be written during the current write operation. If so, an additional shift of the M-bit sequence is performed at step 216 in response to the additional row address. In one embodiment, the M-bit sequence is shifted from its previous position by one additional increment for each row. This is merely illustrative and is not limiting as any amount of additional shifting can be applied. Using a single bit location shift for each row is convenient, as illustrated in FIG. 9.

As shown by step 218, the shifted M-bit sequence is used to scramble the input write data to for the additional row, and the scrambled data are written to the additional row at 220. The process continues for each additional row as shown, until such time that all rows of the input data have been written. At this point, the process flow passes from decision step 214 to step 222 where the write operation is successfully completed and the process ends.

While not expressly set forth by the routine of FIG. 10, it will be appreciated that similar processing is applied for current data sets that are migrated during garbage collection operations. For example, should a given GCU (e.g., 138, FIG. 5) be subjected to garbage collection, stale data sets will be simply erased and current data sets will be migrated to a new, different location prior to erasure.

In the case of such data migration, the data are unscrambled in a manner discussed below to recover the originally presented input write data. The originally presented input write data are thereafter rescrambled using the process of FIG. 10 for writing to the new, different erasure block location. While this presents some measure of additional overhead processing to both unscramble and rescramble the data, it is contemplated that such processing will not be extensive and can significantly extend the overall operational life of the memory by reducing unnecessary wear from unbalanced program states as discussed above.

Figure 11:
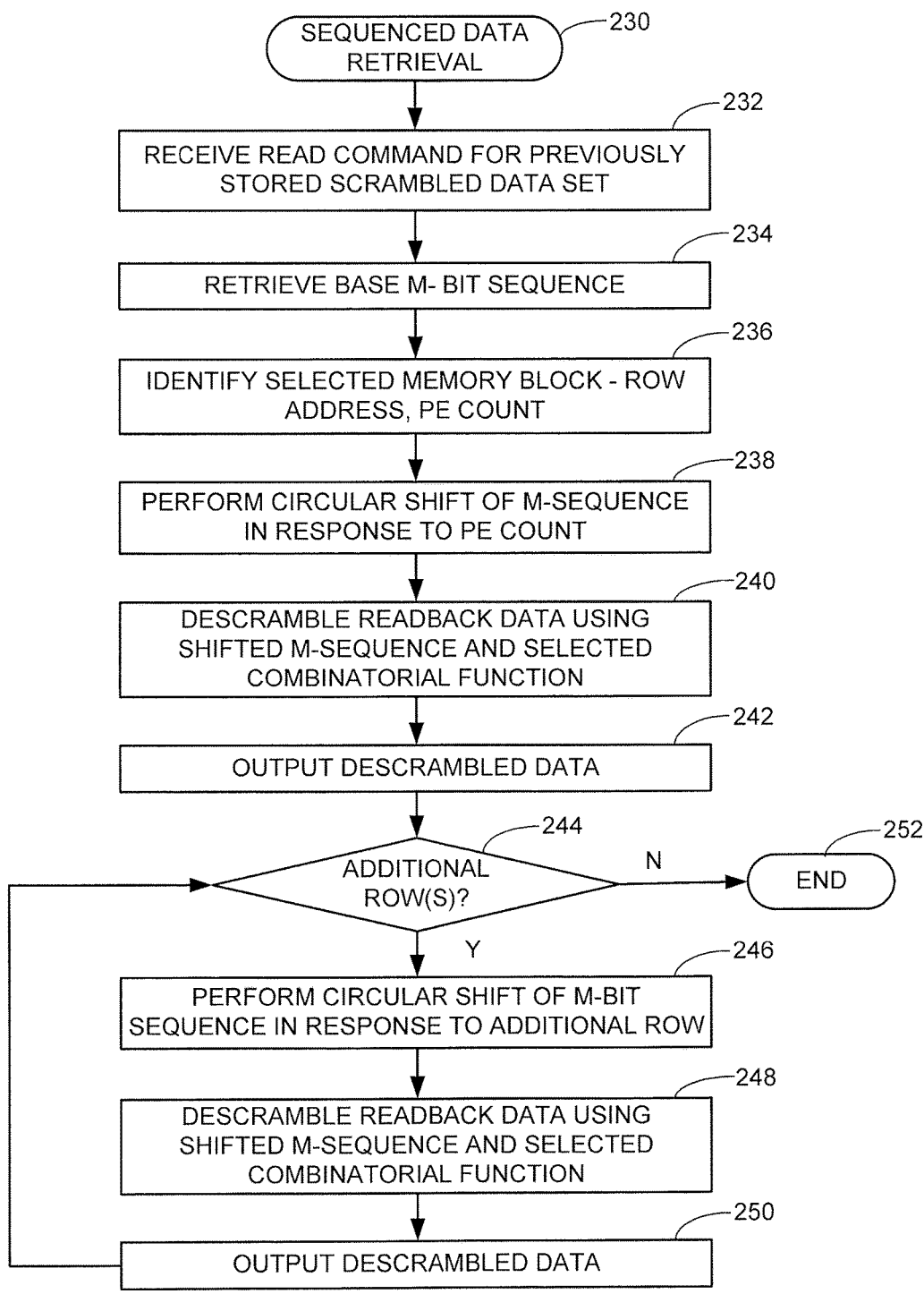
FIG. 11 is a flow chart for a SEQUENCED DATA RETRIEVAL routine generally illustrative of steps carried out in accordance with various embodiments of the present disclosure.

Recovering the data during a subsequent read operation is carried out by a sequenced data retrieval routine 230 in FIG. 11. Generally, the routine 230 in FIG. 11 reverses the operation of the routine 200 in FIG. 10 to enable the originally presented data to be recovered and returned. It is contemplated that the routine of FIG. 11 is carried out responsive to a host generated read command to retrieve a selected data set from the array, although the routine can be carried out at other times such as, for example, during garbage collection operations during which a data set is relocated to a new erasure block.

A read command to retrieve a previously scrambled data set is received at step 232. In response, the base M-bit sequence is retrieved at step 234, and the selected erasure block that stores the requested data is retrieved at step 236, along with the particular row address and PE count associated with the erasure block. It will be noted at this point that PE counts are particularly suitable for use as the shift indicator since this value will remain constant so long as the previously written data remain in the selected location. In other words, using PE counts are convenient in that the data count is not incremented until an erasure occurs, which means that if the data are still present and valid, the PE count is still valid as an indicator of the shift locations applied to the data.

A circular shift of the base M-bit sequence is applied at step 238 and the shifted M-bit sequence is used at step 240 to descramble the readback data retrieved from the selected row address of the selected erasure block. While not necessarily limiting, it is contemplated that the selected combinatorial function (e.g., the XOR function, etc.) will be symmetric so that application of the same function using the shifted M-bit sequence to the scrambled readback data will provide the original unscrambled input data, which is output at step 242.

Decision step 244 determines whether there are additional rows of data to be recovered; if so, the flow passes to step 246 where an additional circular shift of the shifted M-bit sequence is performed in response to the additional row, the data from the additional row are descrambled using the shifted M-bit sequence at step 248, and the descrambled data from the additional row are output at step 250. The foregoing steps are repeated for each additional row associated with the readback data command, after which the command is completed and the process ends at step 252.

While the foregoing embodiments have been directed to solid-state memory in the form of NAND flash memory, other forms of memory can be processed in accordance with the above discussion.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a solid-state memory comprising an array of non-volatile memory cells arranged into erasable blocks, each erasable block comprising a plurality of rows, the memory cells in each row connected to a common control line;
   a register which stores a multi-bit sequence value;
   a controller circuit which provides time and location dependent two-dimensional randomization of input user data received from a host device to be written to a selected erasable block to enhance wear leveling of the memory and security of the data stored therein by combining the input data with the multi-bit sequence value using a selected combinatorial function, the multi-bit sequence value being first shifted by a first number of bit locations responsive to an accumulated access count for the selected erasable block and a second number of bit locations corresponding to an address of an associated row in the selected erasable block to which the randomized input user data is to be written; and
   a write circuit to write the randomized input user data to the associated row in the selected erasable block after the input data has been shifted by the multi-bit sequence value.

2. The apparatus of claim 1, wherein the multi-bit sequence value is shifted by both the first and second numbers of bit locations to provide a first shifted multi-bit sequence value, and the controller further operates to combine the first shifted multi-bit sequence value with a first portion of the input user data using the selected combinatorial function to generate a set of scrambled data, and to direct a writing of the set of scrambled data to the associated row in the selected erasure block.

3. The apparatus of claim 2, wherein the selected combinatorial function is an exclusive-or (XOR) function.

4. The apparatus of claim 2, wherein a first portion of the set of scrambled data is written to a first row of the selected erasable block, and wherein the controller further operates to subsequently shift the first shifted multi-bit sequence value by a third number of bit locations to provide a second shifted multi-bit sequence value, to combine the second shifted multi-bit sequence value with a second portion of the input user data using the selected combinatorial function to generate a second set of scrambled data and to direct a writing of the second set of scrambled data to a second row of the selected erasable block, the first and second portions of the set of scrambled data written responsive to a single host write command.

5. The apparatus of claim 1, wherein the non-volatile memory cells are flash memory cells, the erasable blocks are erasure blocks of the flash memory cells corresponding to a smallest number of cells that can be concurrently erased, and the access count is a program/erase (PE) count associated with each of the erasure blocks indicating a total number of program/erase cycles applied to the respective erasure blocks.

6. The apparatus of claim 1, wherein each erasable block stores data along each row thereof having a total number of N bits, and wherein the multi-bit sequence value has a total number of M random bits.

7. The apparatus of claim 6, wherein N>M.

8. The apparatus of claim 6, where M is at least 512 bits and N is at least 100 times M.

9. The apparatus of claim 1, wherein the controller circuit is realized as a portion of a top level controller coupled to a memory module housing the solid-state memory, and wherein the solid-state memory is characterized as a NAND flash memory.

10. A solid-state drive (SSD) comprising:
an SSD memory module comprising a solid-state memory having an array of non-volatile memory cells arranged into erasable blocks, each erasable block having a plurality of rows of the memory cells to which data are written and from which data are read as a unit;
an SSD controller circuit coupled to the SSD memory module via an internal interface to direct data transfers between the SSD memory module and an external host device;
a data scrambler circuit which enhances wear leveling of the solid-state memory and security of data stored therein by providing a two-dimensional randomization of input data based on time and location factors by shifting a multi-bit sequence value stored in a register by a first selected number of bit locations responsive to an accumulated program/erase (PE) count associated with a selected erasable block and by a second selected number of bit locations responsive to an address of a target row in the selected erasable block to generate a shifted multi-bit sequence value, and which combines the shifted multi-bit sequence value with the input data using a selected combinatorial function to generate a set of scrambled data; and
a write circuit configured to write the set of scrambled data to the target row in the selected erasable block.

11. The SSD of claim 10, wherein the data scrambler circuit is incorporated into the memory module.

12. The SSD of claim 10, wherein the data scrambler circuit is incorporated into the SSD controller circuit.

13. The SSD of claim 10, wherein the scrambled data is written to a first row address of the selected erasable block, and wherein a second set of scrambled data is written to a second target row of the selected erasable block, the second scrambled data formed by incrementing the shifted multi-bit sequence value to form an incremented shifted multi-bit sequence value which is combined with second input data using the selected combinatorial function.

14. The SSD of claim 13, wherein the data scrambler circuit further operates to direct a writing of the second set of scrambled data to the second target row having a second row address of the selected erasable block.

15. The SSD of claim 10, wherein the non-volatile memory cells are flash memory cells, the erasable blocks are erasure blocks of the flash memory cells corresponding to a smallest number of cells that can be concurrently erased, and the accumulated PE count identifies a total number of program/erase cycles that have been applied to the selected erasable block.

16. The SSD of claim 10, wherein each erasable block stores data along a row thereof having a total number of N bits, and wherein the multi-bit sequence value has a total number of M random bits where N>M.

17. A method comprising:
accumulating by a controller circuit access counts for each of a number of erasable blocks of non-volatile memory cells in a solid-state memory indicative of a total number of access operations upon each of the respective erasable blocks;
receiving by the controller circuit input write data from a host device to be written to a selected erasable block;
scrambling by the controller circuit the input write data to form scrambled write data, the scrambled write data formed by shifting a base multi-bit sequence value in a register by a first number of bit locations selected in relation to the access count for the selected erasable block and by a second number of bit locations selected in relation to a row address of the selected erasable block to provide a shifted multi-bit sequence value, and by combining the shifted multi-bit sequence value with the input write data using a selected combinatorial function; and
writing by a write circuit the scrambled write data to a selected row of the selected erasable block having the row address, the scrambled write data enhancing data security and wear leveling of the memory via the scrambling by the controller circuit along time and location axes.

18. The method of claim 17, wherein the selected combinatorial function is an exclusive-or (XOR) function.

19. The method of claim 17, wherein the scrambled write data are written to a first row of the selected erasable block, and the method further comprises incrementing the shifted multi-bit sequence value by at least one additional bit location for each additional row of the selected erasable block to which scrambled data are written to further provide said scrambling along time and location axes.

20. The method of claim 17, further comprising subsequently descrambling the scrambled write data by retrieving the access count and the row address for the selected erasable block, shifting the base multi-bit sequence value by a total number of bit locations corresponding to the access count and the row address, and applying the selected combinatorial function to the scrambled write data to recover the input write data.

* * * * *